United States Patent Office 3,500,891
Patented Mar. 17, 1970

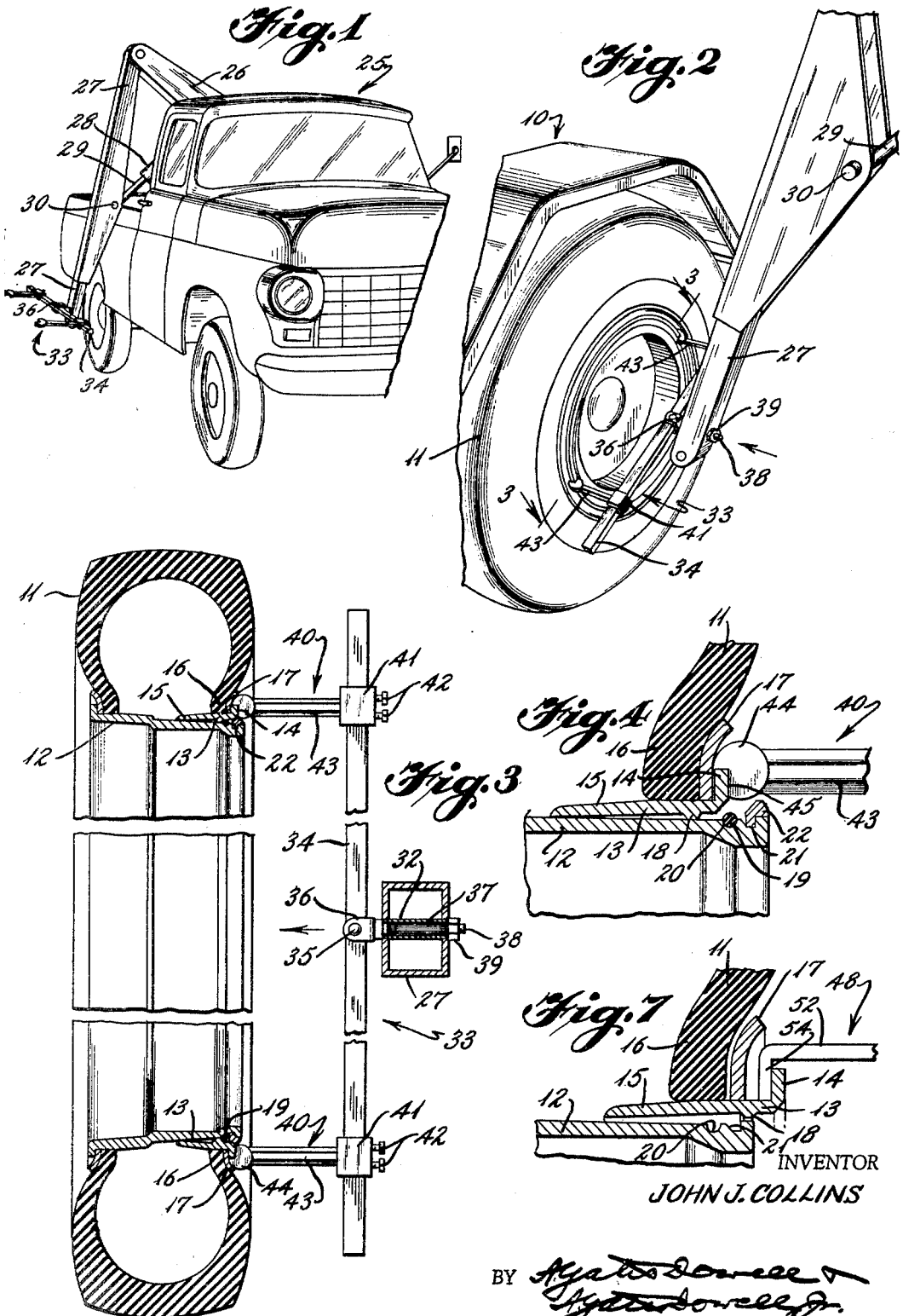

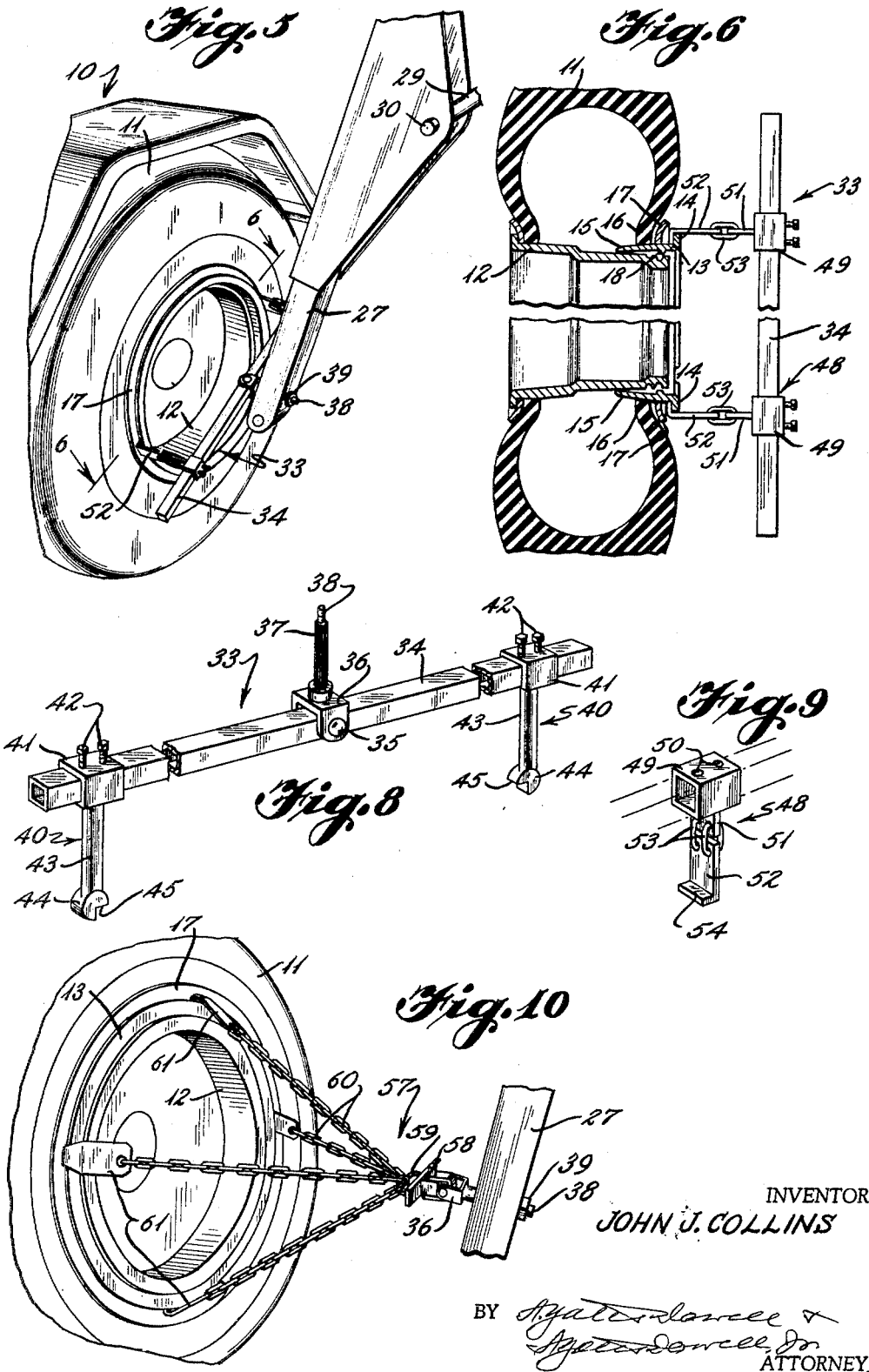

3,500,891
HEAVY EQUIPMENT TIRE REPAIR DEVICE
John J. Collins, Charlottesville, Va.
(Lake Shore Drive, Clear Lake, Iowa 50428)
Filed Feb. 23, 1968, Ser. No. 707,494
Int. Cl. B60c 25/06, 25/00
U.S. Cl. 157—1.2                                      4 Claims

ABSTRACT OF THE DISCLOSURE

Apparatus for changing and repairing the tires of heavy equipment without removing the wheels from the vehicle. The apparatus includes an adjustable bar on which pushing and pulling members can be mounted for selective use.

BACKGROUND OF THE INVENTION

Field of the invention

This invention relates generally to the application and removal of pneumatic tires on automotive vehicles of various kinds and relates particularly to apparatus for repairing or changing tires of heavy equipment where it is either impractical or impossible to remove the wheel or rims from the vehicle.

Description of the prior art

When a tire on an automobile or small truck is to be repaired or changed, the wheel is removed from the hub to facilitate the easy removal of the tire. On larger vehicles such as large trucks, graders, earthmovers, and the like, it is impractical and sometimes impossible to remove the wheel due to the weight and size of the same, as well as the fact that in some instances the rim is an integral part of the drive system and therefore can be removed only in a well equipped repair shop. With the advent of the tubeless tire and the increased size of tires for larger vehicles, special rims have been provided which include a bead seat ring having a fixed or removable flange, a seal ring and a split lock ring so that tires can be repaired and changed in the field. Normally the work is done manually and requires a substantial amount of hard labor including hammering with a heavy sledge hammer, prying with a lever and using wedges. It usually takes several hours to change a single tire due to the fact that a new tire may have from 28 to 44 ply and may weigh well over a ton. Also, since the tires are tubeless, the factory usually applies a metal band around the center of the tread so that the beads of the tire will remain spread apart.

Some efforts have been made to provide apparatus to assist in the repair and removal of the tires of heavy equipment and these have included fluid cylinders which could be clamped onto the flange of the rim and utilized to move the tire bead from the bead seat ring and thereby assist in the removing of the tire from the wheel. These devices have not been entirely satisfactory since they are for use primarily with the removing of the tire from the wheel and have not been of value in placing a new tire on the rim. Also it has been found that sometimes it is necessary only to replace the seal ring and in order to do this it is necessary only to move the bead seat ring inwardly a distance sufficient to expose the seal ring. After the seal ring has been replaced, the bead seat ring must be returned to its initial position. In a new tire the natural resilience of the tire will cause the bead seat ring to be moved to its airtight position. However, in a tire that has been in use for some time, the tire is not as resilient and therefore it is necessary that the bead seating be pulled outwardly to a sealing position before air is introduced into the tire.

SUMMARY OF THE INVENTION

The present invention is a device carried by a tire repair truck having a hydraulically controlled hoist boom and such device includes a bar adjustably mounted on the boom and having spaced pusher rods adapted to engage the bead seat ring of the rim and push the same inwardly to expose the seal ring and the split locking ring which are then removed. Thereafter the bead seat ring can be removed, either by expansion of the tire or a puller attachment can be mounted either on the bar or directly on the boom. When a new tire is to be put on the rim, such tire is lifted by the boom until the inner bead can be placed on the rim and thereafter the bead seat ring can be placed on the outer bead and pushed onto the rim by the bar and pusher rods to a position where the seal ring and lock ring can be applied.

It is an object of the invention to provide a relatively simple apparatus by which a heavy equipment tire can be repaired or replaced in the field without removing the rim from the vehicle.

Another object of the invention is to provide pushing and pulling apparatus for use in the repair and replacement of heavy equipment tires.

BRIEF DESCRIPTION OF THE DRAWINGS

FIG. 1 is a perspective of a repair truck to which the invention has been applied.

FIG. 2 is an enlarged perspective illustrating one use of the device as it is being applied to a heavy equipment tire.

FIG. 3 is an enlarged section on the line 3—3 of FIG. 2.

FIG. 4 is an enlarged fragmentary detail section illustrating the use of one of the pusher rods.

FIG. 5 is a perspective similar to FIG. 2 illustrating the use of the puller attachment.

FIG. 6 is an enlarged fragmentary section on the line 6—6 of FIG. 5.

FIG. 7 is an enlarged fragmentary detail section similar to FIG. 4 illustrating the use of one of the puller attachments.

FIG. 8 is a perspective of the device per se with pusher rods attached.

FIG. 9 is a detail perspective illustrating the puller attachment per se; and

FIG. 10 is a perspective illustrating a modified form of puller attachment.

DESCRIPTION OF THE PREFERRED EMBODIMENTS

With continued reference to the drawings, a heavy equipment vehicle 10, which may be a large truck, tractor, grader, earthmover or the like, is provided with tires 11 mounted on rims 12. In order to retain the tire on the rim and to provide an airtight seal, a bead seat ring 13 having a flange 14 is provided and such bead seat ring has a tapered upper surface 15 on which the bead 16 of the tire 11 is to be mounted. A bead retaining flange 17 is disposed between the flange 14 and the bead 16 to retain the tire on the bead seat ring 13. A boss 18 is provided on the inner periphery of the bead seat ring 13 which is adapted to engage an O-ring or seal ring 19 carried in a recess 20 in the rim 12 to form an airtight connection. A second recess 21 is provided in the rim 12 exteriorly of the recess 19 for the reception of a split retaining ring or lock ring 22 which engages the bead seat ring and holds it in place when air under pressure is introduced into the tire.

In order to change or repair a tire 11 when it becomes necessary, a repair truck 25 is provided with a fluid controlled hoist arm 26 to which a boom 27 is pivotally mounted. The boom is controlled by a fluid cylinder 28 (FIG. 1) having a piston rod 29, the outer end of which is connected to the boom by a pivot pin 30. The structure thus far described is conventional in the prior art and forms no part of the inventive concept.

Adjacent to the outer or free end of the boom 27 an opening is provided for a splined bushing or sleeve 32 which extends through the boom and is fixed in position in any desired manner, as by welding or the like.

A tire repair tool 33 is removably mounted in the sleeve 31 in such a manner that the tool can be fixed within the sleeve when in use and can be removed therefrom when not in use so as not to interfere with the normal operation of the boom. The tool includes an elongated bar 34 of generally square cross-section and of a length greater than the diameter of the rim of the wheels on which it will be used. The central portion of the bar 34 is connected by a pivot 35 to a yoke 36 having a splined shaft 37 extending outwardly therefrom and terminating in a reduced threaded extension 38. The splined shaft 37 is of a size to be received within the splined sleeve 32 and is held in position by a nut 39 threadedly engaging the extension 38. It will be noted that the bar can be disposed at any desired angle before the splined shaft is inserted in the splined sleeve and cannot be moved other than by withdrawing the shaft from the sleeve.

With reference to FIGS. 2–4 and 8, when the device is to be used as a pusher to move portions of the tire 11 or rim 12 inwardly, a pusher unit 40 is selectively placed on each end of the bar 34. Each pusher unit includes a sleeve 41 slidably mounted on each end of the bar 34 and each sleeve may be provided with one or more set screws 42 for locking the same in fixed adjusted position thereon. The sleeve 41 has an outwardly extending pusher rod 43 which terminates in an enlarged head 44 having a notch or recess 45 in the outer end for a purpose which will be described later.

With reference to FIGS. 5–7 and 9 when the device is to be used as a puller to move portions of the tire or rim outwardly, a puller unit 48 is placed on each end of the bar 34. Each puller unit includes a sleeve 49 slidably mounted on the bar 34 and such sleeve may have one or more set screws 50 located within threaded openings for locking the same in fixed adjusted position thereon. Each of the sleeves 49 has an outwardly extending lug or projection 51 the outer end of which is swingably connected to a puller member 52 in any desired manner, as by one or more rings 53. The puller member 52 includes a flange 54 at its outer free end for engaging portions of the tire or rim and pulling outwardly on the same when the boom 27 is retracted.

With reference to FIG. 10 a modified form of puller assembly 57 is provided in which the bar 34 is removed from the yoke 36 and a universal joint 58 is placed in such yoke. The universal joint 58 is provided with a loop or eye 59 to which a plurality of lengths of chain 60 are connected. Although four chains have been illustrated, it is contemplated that any desired number can be provided, with at least two chains being necessary. Each of the chains has a puller bracket 61 connected to the end remote from the loop 59 and each of such brackets terminates in an inwardly extending flange or other hook forming structure (not shown).

In the operation of the device the driver of the repair truck drives such truck to a position beside the heavy equipment vehicle 10 after which the driver places a jack under the disabled vehicle and raises one corner thereof until the tire is out of engagement with the ground. If it is necessary to replace the tire, the tire repair tool 33 is removed from the truck and the splined shaft 37 is placed within the sleeve 32 and secured in position by the nut 39 with the bar 34 in any desired position. The pusher unit 40 is then slid onto each end of the bar 34 and moved to the desired position after which the set screws are tightened. As illustrated in FIGS. 2–4 the pusher units are located so that the recesses 45 receive the flange 14 of the bead seat ring 13 and when the fluid cylinder 28 is operated to push the boom 27 toward the vehicle 10, the bead seat ring 13 will be moved inwardly to expose the lock ring 22 and the seal ring 19. The lock ring and the seal ring then are removed using conventional tools, after which the pressure on the pusher unit is relieved. Normally the tire will move the bead seat ring outwardly to a position off of the rim 12 where it is removed from the tire. If the tire does not move the bead seat ring outwardly off of the rim, it may be necessary to replace the pusher unit 40 with puller units 48 so that the flanges 54 can be forced between the flanges 14 and 17 and upon retraction of the boom 27 the bead seat ring will be forcibly pulled from the rim 12.

After the old tire has been removed a new tire is placed on the rim 12, after which the retaining flange 17 and the bead seat ring 13 can be placed on the outer bead of the tire. The pusher unit 40 again is placed on the bar 34 so that when the piston rod 29 of the cylinder 28 is extended, the boom 27 will push the bead seat ring 13 onto the rim 12. After the seal ring 19 and the lock ring 22 are placed in position the pressure on the cylinder 28 is relieved and the tire will move the bead seat ring outwardly into engagement with the lock ring 22.

If it is desired to "break" the bead from the bead seat ring, the pusher units 40 may be moved outwardly along the bar 34 to a position where the retaining flange 17 will be received within the recess 45 of the pusher unit so that when the fluid cylinder is operated a direct force will be applied to the bead 16 of the tire to move the bead across the upper surface 15 of the bead seat ring 13.

It is noted that if the tire should be difficult to remove after the bead seat ring has been removed, the flanges 54 and 61 of the puller units could be inserted behind the outer bead of the tire so that when a pulling force is applied to the bar 34 the tire will be pulled from the rim.

It will be obvious to one skilled in the art that various changes may be made in the described embodiments of the invention without departing from the spirit and scope thereof and therefore the invention is not limited by that which is illustrated in the drawings and described in the specification, but only as indicated in the accompanying claims.

I claim:

1. Apparatus carried by a repair truck having double-acting fluid means for removing and replacing a tire from a vehicle rim while the rim remains on the vehicle, comprising an elongated bar means, a splined shaft mounted on said bar means, means for mounting said splined shaft on the double acting fluid means of the truck which is capable of applying pushing and pulling forces selectively, a pair of pusher units and a pair of puller units selectively interchangeably mounted on said bar means, means for securing said pusher units and said puller units in fixed adjusted position on said bar means, whereby said pusher units and said puller units can be selectively utilized to remove a tire from a rim while the rim remains on the vehicle.

2. Portable apparatus carried by a repair truck having an adjustable support operated by fluid cylinder means for repairing or replacing the bead seat ring, seal ring, and lock ring of a heavy equipment vehicle tire rim while the rim remains on the vehicle, said apparatus comprising an elongated bar means of a length greater than the diameter of the tire rim, the truck support means adjustably supporting said bar means in a position adjacent to the rim, means for securing said bar means in fixed adjusted position on said support means, a pair of pusher units slidably mounted on opposite ends of said bar means, means for securing each of said pusher units on said bar means, each of said pusher units including a pusher rod with an enlarged head having a notch adapted to engage the bead seat ring of the rim, the fluid cylinder means of said truck adapted to apply a pushing force to said support means to move said bar means and said pusher units toward said rim and move the bead seat ring away from the lock ring and seal ring, whereby the lock ring and seal ring can be repaired or replaced, or the bar means can be retracted and the bead seat ring can be removed.

3. The structure of claim 2 including a pair of puller units selectively interchangeable with said pair of pusher units, means for securing said puller units on said bar means, hook means on each of said puller units for selectively engaging the bead seat ring or the tire, and the fluid cylinder means being double acting to apply a pushing or pulling force to the adjustable support and said bar means.

4. Portable apparatus carried by a repair truck for repairing or replacing the bead seat ring, seal ring, lock ring and tire of a heavy equipment vehicle while the rim remains on the vehicle, said apparatus comprising an elongated bar means, support means mounted on said truck and adjustably supporting said bar means in a position adjacent to the wheel of the vehicle, means for securing said bar means in adjusted position on said support means a pair of pusher units adjustably mounted on opposite ends of said bar means and adapted to be secured in fixed adjusted position, each of said pusher units including a pusher rod with an enlarged head engageable with said bead seat ring, double acting fluid cylinder means mounted on said truck and being operable in a first direction for applying a pushing force to said support means to move the bead seat ring and the tire bead away from the lock ring and seal ring so that the lock ring and seal ring can be removed, a pair of puller units selectively interchangeable with said pusher units after the lock ring and seal ring are removed, means on said puller units for engaging the bead seat ring so that operation of the fluid cylinder means in the opposite direction will remove the bead seat ring to permit removal of the tire from the vehicle.

References Cited

UNITED STATES PATENTS

| | | | |
|---|---|---|---|
| 1,140,806 | 5/1915 | Emerick | 157—1.36 |
| 1,638,476 | 8/1927 | Dalton | 157—11 |
| 1,649,679 | 11/1927 | Freivogel | 157—1.2 X |
| 1,724,813 | 8/1929 | Weaver | 157—1.2 |
| 1,729,861 | 10/1929 | Anderson | 157—1.2 X |
| 2,775,289 | 12/1956 | Anderson | 157—1.1 |
| 2,778,414 | 1/1957 | Oglesby | 254—50.3 X |
| 2,841,300 | 7/1958 | Berquist | 214—620 |
| 3,066,726 | 12/1962 | Berry | 157—1.1 |
| 3,181,587 | 5/1965 | Morrison | 157—1.17 |
| 3,362,453 | 1/1968 | Nester | 157—1.17 |
| 3,410,432 | 11/1968 | Foss | 214—620 |

WAYNE A. MORSE, Jr., Primary Examiner

U.S. Cl. X.R.

157—1.42, 144; 214—151, 620; 254—50.3